United States Patent [19]

Miyake

[11] Patent Number: 5,116,658
[45] Date of Patent: May 26, 1992

[54] MAGNETIC RECORDING MEDIUM

[75] Inventor: Toru Miyake, Hino, Japan

[73] Assignee: Konica Corporation, Tokyo, Japan

[21] Appl. No.: 619,890

[22] Filed: Nov. 29, 1990

[30] Foreign Application Priority Data

Dec. 4, 1989 [JP] Japan .................. 1-315001
Dec. 4, 1989 [JP] Japan .................. 1-315002
Dec. 4, 1989 [JP] Japan .................. 1-315003

[51] Int. Cl.$^5$ ............................. G11B 23/00
[52] U.S. Cl. .................... 428/141; 428/143; 428/694; 428/900
[58] Field of Search ............ 428/141, 143, 480, 694, 428/900

[56] References Cited

U.S. PATENT DOCUMENTS

| | | | |
|---|---|---|---|
| 4,568,599 | 2/1986 | Ono et al. | 428/480 |
| 4,670,319 | 6/1987 | Katoh et al. | 428/480 |
| 4,748,084 | 5/1988 | Hata et al. | 428/694 |
| 4,865,898 | 9/1989 | Fukuda et al. | 428/143 |

*Primary Examiner*—Paul J. Thibodeau
*Attorney, Agent, or Firm*—Jordan B. Bierman

[57] ABSTRACT

A magnetic recording medium having excellent electromagnetic conversion characteristics, improved running durability, and reduced head abrasion. The medium comprises a support or substrate, having the films thereon, and a magnetic layer, wherein 1) the surface waviness of the magnetic layer is 0.022 $\mu$m or less;
2) the surface waviness of the support on the magnetic layer side is 0.020 $\mu$m or less; and
3) at least one of the two surfaces of the support, or the film surface opposite to the substrate, has the protrusions satisyfing the following relationships:
   a. the average height is from 0.01 $\mu$m to 0.25 $\mu$m,
   b. a number of the protrusions not lower than 0.01 $\mu$m is not less than 200 per 1 mm,
   c. a number of the protrusions not lower than 0.30 $\mu$m is not more than 500 per 400 mm, and
   d. a ratio of a maximum height to an average height is not more than 10.

20 Claims, No Drawings

MAGNETIC RECORDING MEDIUM

FIELD OF THE INVENTION

This invention relates to a magnetic recording medium, more particularly to a magnetic recording medium which has excellent running property and durability as well as excellent electromagnetic conversion properties lower rubbing noise and head stain; and no abrasion on the surface thereof in running in a deck.

BACKGROUND OF THE INVENTION

Magnetic recording media such as video tapes and audio tapes are required to have excellent electromagnetic conversion properties, running property and durability.

For satisfying the above requirements, various attempts have so far been tried.

For the purpose of improving all of the electromagnetic conversion properties, running property and durability, there is proposed a magnetic recording medium in Japanese Patent Publication Open to Public Inspection (hereinafter called JP O.P.I.) No. 60-93626/1985, in which a surface roughness $R_a(M)$ of a support surface on a magnetic layer side is controlled to not greater than 0.03 μm; a surface roughness Ra(B) of a support surface opposite to the magnetic layer is controlled to 0.02 to 0.1 μm; and R(M) and R(B) satisfy the following equation: $R_a(M) < R_a(B)$.

However, a waviness on a support surface deteriorates the electromagnetic conversion properties. If a support surface opposite to a magnetic layer is roughened by providing high protrusions thereon, the protrusions on a wound tape are liable to stick into a magnetic layer surface and roughen it; a dropout is caused by scraping-off of the high protrusions in manufacturing; and further, the high protrusions are scraped off while running in a deck and the fillers contained therein may damage the support surface to produce noises. Because of the above reasons, the electromagnetic conversion properties cannot always be improved even if the roughness of a support surface on a magnetic layer side is simply minimized.

On the contrary to the above, there is proposed a magnetic recording medium in JP O.P.I. No. 57-150130/1982, in which the surface roughness of a support on a magnetic layer side is roughened more than that of the support surface opposite thereto in order to improve the electromagnetic conversion properties.

However, a very smooth support surface opposite to the magnetic layer is liable to cause troubles in transporting such as weaving or sticking in a calendering process.

Further, there are disclosed various recording media in JP O.P.I. 185224/1987 where μK and Rrms of a magnetic layer are controlled to lower a head stain; in JP O.P.I. 268118/1988 where a magnetic layer contains a binder comprising a vinyl chloride resin having a phosphoric acid group and a polymer having a functional group, and alumina having an average particle size of 0.1 to 0.3 μm; and in JP O.P.I. 275022/1988 where foregoing alumina is replaced with carbon black having an average particle size of 20 to 120 μm.

However, mere control of μK and Rrms of a magnetic layer involves such problems that head stain is not necessarily lowered and that the electromagnetic conversion properties are rather deteriorated and an abrasion of a magnetic head is increased.

Addition of alumina for elimination of head stain is liable to have a problem that head stain is inevibaly increased, and adding carbon black for solving the head stain problem is liable to inevitably result in deteriorating the electromagnetic conversion properties.

Further, any one of the above technologies are not suitable for improving dispersibility of a magnetic powder by treating the surfaces thereof with $SiO_2$.

Further, there are proposed the magnetic recording media in JP O.P.I. 146129 to 146131/1989 where a magnetic layer contains a hydrate of metal oxide to reduce a rubbing noise; and in JP O.P.I. 77030/1983 where there is used a plastic film support having a specific contact angle with water to increase adhesiveness of a magnetic layer to a support.

The magnetic recording medium containing a metal oxide hydrate involves the problem that dispersibility of a coating solution for a magnetic layer is worsened, so that the electromagnetic conversion properties are deteriorated. Further, the magnetic recording medium comprising a plastic film support having the specific contact angle with water also has the problem that an additive to the plastic film is liable to deteriorate rigidity of the support, which in turn results in deteriorating a running property and a durability of the recording medium.

SUMMARY OF THE INVENTION

It is an object of the invention to provide a magnetic recording medium having an excellent running property and a durability as well as the excellent electromagnetic conversion properties without causing abrasion of the surface thereof in the course of manufacturing or running in a deck.

Another object of the invention is to provide a magnetic recording medium having a lower rubbing noise and less head stain and abrasion.

The above objects of the invention can be achieved with a magnetic recording medium comprising a non-magnetic support and provided thereon a magnetic layer, wherein a surface waviness of the magnetic layer is not greater than 0.022 μm; a surface waviness of the support on the magnetic layer side is not greater than 0.020 μm; and at least one of the support surfaces has the protrusions satisfying the following conditions;

a. an average height is not lower than 0.01 μm and not higher than 0.25 μm;

b. the number of the protrusions not lower than 0.01 μm is not less than 200 per 1 mm;

c. the number of the protrusions not lower than 0.30 μm is not more than 500 per 400 mm; and d. the ratio of the maximum height to an average height is not more than 10.

DETAILED DESCRIPTION OF THE INVENTION

Non-magnetic support

In the magnetic recording media of the invention, the materials for the nonmagnetic support are polyesters such as polyethylene terephthalate and polyethylene-2,60-naphthalate; polyolefins such as polypropylene; cellulose derivatives such as cellulose triacetate and cellulose diacetate; and plastics such as polycarbonate, aromatic polyamide and polyimide. Besides the above, there can be used metals such as Cu, Al and Zn, glass, and various ceramics such as, boron nitride and silicon carbide.

The support may contain the fillers.

In the invention, it is required that the surface waviness of the support on the magnetic layer side is not higher than 0.020 μm and that an average height of the protrusions on at least one of the support surfaces is not lower than 0.01 μm and not higher than 0.2 μm.

The surface waviness of the support on the magnetic layer side is controlled to 0.020 μm or lower, preferably 0.018 μm or lower, and more preferably 0.015 μm or lower, whereby a surface waviness of a magnetic layer provided on the support can be lowered and the electromagnetic conversion properties, especially chroma S/N, can be improved.

The foregoing protrusions can be formed on at least one of the support surfaces by incorporating into the support the filler particles having an average particle size of not larger than 2 μm, preferably 0.01 to 1 μm in an amount of not more than 2% by weight, preferably 0.01 to 10% by weight.

The average height of the protrusions on at least one of the support surfaces is controlled to not lower than 0.01 μm, whereby weaving and sticking of a recording medium can be prevented in the coating and calendering step, so that a running property and a durability can be improved. Rubbing noise and head stain can also be minimized.

The above average height of the protrusions is controlled to not higher than 0.20 μm, whereby the surface waviness on the magnetic layer can be lowered, so that the electromagnetic conversion properties can be improved. The average height exceeding 0.20 μm will result in increasing the surface waviness on the magnetic layer and therefore deteriorating the electromagnetic conversion properties.

Further, on at least one of the support surfaces, the number of the protrusions having a height of not lower than 0.01 μm is not less than 200, preferably not less than 200 and not more than 2000 per 1 mm; the number of the protrusions not lower than 0.30 μm is not more than 500, preferably not more than 100 per 400 mm; and the ratio of the maximum height to the average height of the protrusions is not more than 10, preferably not more than 5.

The number of the protrusions not lower than 0.01 μm is controlled to the foregoing levels, whereby a running property can be improved; a rubbing noise can be lowered; a surface of a magnetic layer is less liable to damage; and a durability can be improved.

The number of the protrusions not lower than 0.30 μm is controlled to the foregoing levels, whereby a surface waviness on a magnetic layer can be minimized, so that the electromagnetic conversion properties can be improved.

Further, the ratio of the maximum height to an average height of the protrusions is controlled to the foregoing levels, whereby a running property and a durability of a recording medium can be improved without deteriorating any electromagnetic conversion properties, and an abrasion of a recording head can be reduced.

The protrusions can be provided on at least one of the support surfaces by providing a protrusion layer containing the particles which have a particle size as uniform as possible and a shape as globular as possible in a proportion of 0.1 to 10% by weight, preferably 0.1 to 5% by weight. The protrusion layer has an average thickness of 0.01 to 1 μm, preferably 0.01 to 0.5 μm.

The protrusions may be formed by incorporating the above particles into the support. Further, the physical protrusions may be formed on the support surface without using the particles.

The form of the support may be a tape, a sheet, a card, a disk or a drum.

The thickness of the support is 3 to 150 μm, preferably 4 to 100 μm in a tape or a sheet, and 30 to 100 μm in a disk or a card.

The support may be provided on the back thereof with a back coat layer to improve a running property of a recording medium and prevent electrification and sticking of the protrusions.

A subbing layer may be provided to improve an adhesiveness of the magnetic layer to the support.

Another preferable embodiment of the invention is a magnetic recording medium comprising a nonmagnetic support consisting essentially of a substrate and the films provided on the both sides thereof, and a magnetic layer, wherein a a surface waviness of the magnetic layer is not more than 0.022 μm; and a film surface opposite to the substrate has the protrusions satisfying the following conditions:

a. an average height is not lower than 0.01 μm and not higher than 0.25 μm;

b. the number of the protrusions not lower than 0.01 μm is not less than 200 per 1 mm; and c. the number of the protrusions not lower than 0.30 μm is not more than 500 per 400 mm;

and a ratio of the maximum height to an average height of the protrusions on the surfaces of the film provided opposite to the magnetic layer is not more than 10.

The surface waviness of the substrate is controlled to not higher than 0.020 μm, preferably not higher than 0.018 μm and more preferably not higher than 0.015 μm, whereby the surface waviness on the magnetic layer can be lowered to improve the electromagnetic conversion properties, particularly chroma S/N.

The foregoing protrusions can be formed on the film surfaces by incorporating into the films the filler particles having an average particle size of not larger than 2 μm, preferably 0.01 to 1 μm in a proportion of not more than 2% by weight, preferably 0.01 to 1.0% by weight.

The average height of the protrusions on each of the film surfaces opposite to the substrate, especially the film surface (hereinafter referred to as the surface I) opposite to the magnetic layer, is controlled to not lower than 0.01 μm, whereby a durability of a recording medium can be improved while weaving and sticking in the coating and calendering steps thereof can be prevented to improve a running property. Further, the average height of the protrusions on the film surface (hereinafter referred to as the surface II) opposite to the substrate on the magnetic layer side is. controlled to not lower than 0.01 μm, whereby weaving of a recording medium can be in the coating and calendering steps prevented to improve a running property while a rubbing noise can be lowered.

Further, the average height of the protrusions on the film surfaces is controlled to not higher than 0.20 μm, whereby the surface waviness on the magnetic layer can be reduced to improve the electromagnetic conversion properties.

The number of the foregoing protrusions not lower than 0.01 μm is not less than 200, preferably not less than 200 and not more than 2000 per 1 mm; the number of the foregoing protrusions not lower than 0.30 μm is not more than 500, preferably not more than 100 per 400 mm; and the foregoing ratio of the maximum height to the average height of the protrusions is not more than 10, preferably not more than 5.

In the invention, a magnetic recording medium having a low rubbing noise and an excellent running property can be provided by controlling to the foregoing levels the number of the protrusions on the surface II having a height of not lower than 0.01 $\mu$m; and a running property of the magnetic recording medium can be improved and the support surface opposite to the magnetic layer can be less liable to damage in rolling up the recording medium by controlling to the foregoing levels the number of the protrusions on the surface I having a height of not lower than 0.01 $\mu$m.

Further, the surface waviness on the magnetic layer can be minimized to improve the electromagnetic conversion properties by controlling to the foregoing levels the number of the protrusions on the film surfaces having a height of not lower than 0.30 $\mu$m.

The ratio of the maximum height to the average height of the protrusions on the surface I is controlled to the foregoing levels, whereby increase of the surface waviness on the magnetic layer can be prevented to improve the electromagnetic conversion properties and the support surface opposite to the magnetic layer can be less liable to damage in rolling up a recording medium, while the protrusions can be less liable to scrape in the coating and calendering steps to prevent dropout.

Magnetic layer

A magnetic layer provided on a support directly or via a subbing layer contains a ferromagnetic powder dispersed in a binder.

In the invention, the surface waviness of the magnetic layer is not higher than 0.022 $\mu$m, preferably not higher than 0.020 $\mu$m and more preferably not higher than 0.018 $\mu$m.

The surface waviness of the magnetic layer is controlled to the above levels, whereby the electromagnetic conversion properties, particularly chroma S/N, can be improved.

The surface waviness on the magnetic layer can be controlled to not higher than 0.022 $\mu$m by subjecting the recording medium to surface smoothing treatment with a supercalendering roll after coating a magnetic paint on the support, or by incorporating into the magnetic layer a ferromagnetic powder having a small particle size. The surface waviness on the magnetic layer can be controlled to not higher than 0.022 $\mu$m by using a resin having a functional group for the binder or an equipment having a high shear force such as a pressure kneader so that the dispersibility of the ferromagnetic powder can be improved.

Ferromagnetic powder

The examples of the ferromagnetic powder used in the invention are iron oxide magnetic powder such as Co-containing $\gamma$-Fe$_2$O$_3$ powder, Co-containing Fe$_3$O$_4$ powder, and Co-containing FeO$_x$(4/3<x<3/2) powder; and ferromagnetic metal powder or ferromagnetic alloy powder, such as Fe powder, Ni powder, Co powder, FeN powder, Ba-ferrite powder, Fe-Al alloy powder, Fe-Ni alloy powder, Fe-Al-Ni alloy powder, Fe-Al-P alloy powder, Fe-Ni-Si-Al alloy powder, Fe-Ni-Si-Al-Mn alloy powder, Ni-Co alloy powder, Fe-Mn-Zn alloy powder, Fe-Ni-Zn alloy powder, Fe-Co-Ni-Cr alloy powder, Fe-Co-Ni-P alloy powder, Co-Ni alloy powder and Co-P alloy powder.

Among the above ferromagnetic powders, Co-containing $\gamma$-Fe$_2$O$_3$ powder, Fe powder and FeN powder are preferably used.

The form of the above ferromagnetic powder is preferably needle but may also be globular, ellipsoidal or tabular.

The specific surface area (BET value) of the ferromagnetic powder is normally not less than 25 m$^2$/g, preferably 30 to 80 m$^2$/g.

The coercive force of the ferromagnetic powder is 500 to 2,000 Oe, preferably 600 to 1,700 Oe.

An average length of a longitudinal axis of ferromagnetic powder is normally 0.1 to 0.4 $\mu$m, preferably 0.15 to 0.30 $\mu$m. The length shorter than 0.1 $\mu$m is liable to make it difficult to disperse the magnetic powder well, and the length exceeding 0.4 $\mu$m is liable to deteriorate the electromagnetic conversion properties.

Binder and other components

Generally, a resin having an average molecular weight of about 10,000 to 200,000 is used as the binder.

The examples thereof are urethane polymer, vinyl chloride resin, vinyl chloride-vinyl acetate copolymer, vinyl chloridevinylidene chloride copolymer, vinyl chloride-acrylonitrile copolymer, butadiene-acrylonitrile copolymer, polyamide resin, polyvinyl butyral, cellulose derivatives such as cellulose acetate butylate, cellulose diacetate, cellulose propionate and nitrocellulose, styrene-butadiene copolymer, polyester resin, various synthetic rubbers, phenol resin, epoxy resin, urea resin, melamine resin, silicone resin, acrylic reactive resin, a mixture of high molecular weight polyester resin and isocyanate prepolymer, a mixture of polyester polyol and polyisocyanate, urea formaldehyde resin, a mixture of low molecular weight glycol and high molecular weight diol compound, and the mixtures thereof.

In the invention, a resin having a negative functional group may also be used independently or together with the above resins.

The above negative functional groups are SO$_3$M$^1$, —OSO$_2$M$^1$, —OSO$_3$M$_1$, and

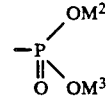

wherein M$^1$ represents a hydrogen atom or an alkali metal; and M$^2$ and M$^3$ represent each a hydrogen atom, an alkali metal and an alkyl group, provided with M$^2$ and M$^3$ may be the same or different from each other.

The resins having a negative functional group can be prepared by introducing the negative functional group into vinyl chloride resin, polyester resin and polyurethane resin.

A ratio of the negative functional group is preferably 0.01 to 10.0 mg/g of the resin.

The ratio of the negative functional group falling within the foregoing range improves a dispersibility of the ferromagnetic powder, which in turn results in increasing an output of the magnetic recording medium and improving a running stability thereof.

The resins having the negative functional groups are used in an amount of 2 to 50 parts by weight, preferably 5 to 40 parts by weight per 100 parts by weight of the ferromagnetic powder.

The amount less than 2 parts by weight may not be able to display satisfactorily the above effects, and the amount more than 50 parts by weight is liable to cause a rubbing noise and a head stain.

A polyisocyanate hardener may be used in combination with the above resins to improve a durability of the magnetic layer.

The examples of the polyisocyanate hardeners are the bifunctional isocyanates such as tolylene diisocyanate, diphenylmethane diisocyanate and hexane diisocyanate; the trifunctional isocyanates such as Colonate L (a trade name, manufactured by Japan Polyurethane Industry Co.); and Desmodule L (a trade name, manufactured by Bayer, AG.); and the conventional hardeners such as a polyurethane polymer having isocyanate groups at the both terminals thereof.

The amount of the hardener is normally 5 to 80% by weight of the binder.

In the invention, there may be used the dispersants such as lecithin, phosphate, fatty acid, an amine compound, alkyl sulfate, fatty acid amide, higher alcohol, polyethylene oxide, sulfosuccinic acid, sulfosuccinate, the known surfactants and the salts thereof, and the polymer dispersants having the salts of the negative functional groups such as —COOH and —PO$_3$H.

They may be used independently or in combination.

In the invention, conventional fatty esters may be used as a plasticizer, such as oleyl oleate, butyl stearate, butyl palmitate, octyl myristate, amyl stearate, stearyl stearate, isobutyl oleate, butoxyethyl palmitate, butoxyethyl stearate, 2-ethylhexyl stearate, ethyl stearate, isopropyl myristate, isooctyl palmitate, isooctyl myristate, butyl laurate, and diethyl adipate. Among the above, the particularly preferable are butyl stearate, butyl palmitate, butoxyethyl palmitate, butoxyethyl stearate, isooctyl palmitate and isooctyl myristate.

The above fatty esters may be used independently or in combination.

The reduced addition amounts of the dispersants and the plasticizers can improve a running stability of a magnetic recording medium particularly in the conditions of a high temperature and a high humidity.

In the invention, the magnetic layers may contain a lubricant.

The examples of the lubricants are fatty acid, a silicone type lubricant, a fatty acid-modified silicone type lubricant, a fluorinated lubricant, liquid paraffin, squalane carbon black, graphite, a carbon black graft polymer, molybdenum disulfide and tungsten disulfide.

They may be used independently or in combination.

Among the above lubricants, fatty acid is preferable, the examples of which are caproic acid, caprylic acid, capric acid, lauric acid, myristic acid, palmitic acid, stearic acid, isostearic acid, linolenic acid, linolic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid.

Among the above fatty acids, the particularly preferable are myristic acid, oleic acid and stearic acid.

The lubricants are added normally in an amount of not more than 20 parts by weight per 100 parts by weight, preferably, not more than 10 parts by weight of a ferromagnetic powder. The amount exceeding 20 parts by weight is liable to cause blooming or bleeding out.

In the invention, the magnetic layer may contain carbon black having an average particle size of 10 to 100 m$\mu$, preferably 20 to 30 m$\mu$. The magnetic layer containing carbon black having the above average particle size can improve a running property of the magnetic recording medium without lowering the electromagnetic conversion properties. The above average particle size smaller than 10 m$\mu$ is liable to deteriorate the running property. The average particle size exceeding 100 m$\mu$ is liable to deteriorate the electromagnetic conversion properties when increasing the amount of carbon black.

Carbon black is added in an amount of not more than 5 parts by weight, preferably not more than 3 parts by weight per 100 parts by weight of a ferromagnetic powder.

The magnetic layers may further contain an abrasive and an antistatic agent.

In the invention, the magnetic layer may have a multilayered structure consisting of a plurality of the magnetic layers each having the different characteristics.

The magnetic recording media of the invention can be prepared in a conventional manner.

The solvents used in kneading and dispersing the components for a magnetic layer are ketone such as acetone, methyl ethyl ketone, and cyclohexanone; alcohol such as methanol and ethanol; ester such as methyl acetate and ethyl acetate; ether such as diethyleneglycol methylether and tetrahydrofuran; aromatic hydrocarbon such as benzene; and hydrocarbon halogenide such as methylene chloride and carbon tetrachloride.

Keading and dispersing can be carried out with the conventional keaders such as a double-roller mill, a continuous keader, a ball mill and a sand grinder.

The magnetic paints are coated by the conventional methods such as a gravure-roll coating method, a wire bar coating method and a doctor blade coating method.

The dry-thickness of a magnetic layer is 0.1 to 10 $\mu$m, preferably 0.5 to 5 $\mu$m.

After coating a magnetic paint, a wet magnetic layer is subjected to a magnetic field orientation treatment and further to a surface smoothing treatment with a supercalender roll.

Next, the magnetic recording medium is cut to a prescribed shape to prepare a video tape, an audio tape and a floppy disk. Further, the magnetic recording medium may be of a card and a cylinder.

EXAMPLES

The invention will be further detailed with reference to the examples of the invention and the comparative examples thereto, wherein the term parts means parts by weight.

EXAMPLE 1

The magnetic layer components having the following compositions were mixed and dispersed for 3 hours with a sand mill, and then 5 parts of a polyisocyanate compound were added and mixed to the dispersion to prepare the magnetic paint.

| Magnetic layer components | |
| --- | --- |
| Co-containing $\gamma$-Fe$_2$O$_3$ ferromagnetic powder (Coercive force Hc: 900 Oe) | 100 parts |
| SiO$_2$ | 0.64 parts |

-continued

| Magnetic layer components | |
|---|---|
| Al$_2$O$_3$ | 5.7 parts |
| Vinylchloride resin having a potassium sulfonate group | 15 parts |
| Thermoplastic polyurethane resin | 7 parts |
| Stearic acid | 1 part |
| Butyl stearate | 1 part |
| Methyl ethyl ketone | 125 parts |
| Toluene | 125 parts |
| Carbon black having an average particle size of 20 mµ | 5 parts |

The magnetic paint was coated on a 15 µm-thick polyethylene terephthalate support having on the reverse side thereof the surface waviness and the protrusions of the height and the number, as shown in Table 1.

Next, the solvents were removed by heating and the magnetic layer was subjected to a surface smoothing treatment with a supercalender under the conditions of a temperature of 60 to 80° C. and a pressure of 100 to 300 kg/cm$^2$ to adjust the surface waviness on the magnetic layer to 0.010 µm. Then, the recording medium was cut to a prescribed size to prepare the video tape Sample No. 1.

Further, the video tape Samples No. 2 to 17 were prepared in the same manner as in Sample No. 1, except that the characteristics of the supports and the magnetic layers were changed as shown in Table 1.

The characteristics of the above video tape samples were evaluated and the results are shown in Table 2.

The characteristics were measured in the following manners:

(a) The surface wavinesses on the magnetic layer and the support surface opposite to the magnetic layer:

the average center line waviness was measured with a Tally-Step surface roughness tester manufactured by Talor & Hobson Co., under the following conditions;

| measurement length | 1 mm |
|---|---|
| needle touch speed | 0.1 mm/sec. |
| cut-off | 2 Hz. |

(b) The number and average height of the protrusions on the support surface opposite to the magnetic layer:

the surface roughness curve was obtained with the Tally-Step surface roughness tester in the following conditions and the heights from the base line of the protrusions exceeding a peak count valure were measured to determine the average protrusion heights and the numbers of the protrusions not lower than 0.010 µm and the protrusions not lower than 0.30 µm, respectively;

| measurement length | 1 mm |
|---|---|
| cut-off (high-pass filter) | 0.33 Hz |
| peak count value | 0.005 µm | provided that the number of the protrusions not lower than 0.30 µm is an average value obtained by repeating the measurements 400 times because of the low value thereof.

(c) Chroma S/N the dB values of the samples relative to that of the reference tape were measured on a deck, Model HR-S7000 manufactured by Japan Victor Co., with a color video noise meter, Model 925D/1 manufactured by Shibasoku Co.

at the frequency of 629 KHz for each signal.

(d) Running property:

the whole length running tests of the tapes were repeated on a deck Model HR-S7000 for 100 hours under the conditions of a temperature of 40.C and a relative humidity of 80%, and the damages on the tape edges were observed. The evaluation results were classied to the following three grades:

○: No edge damages
Δ: Very slight edge damages
X : Significant edge damages over the whole length of the tape.

(e) Scratches on the reverse surface of the support the scratches on the reverse surface of the support were observed after running the tape over the whole length 400 times repeatedly for 5 minutes on a deck Model HR-S7000, and the evaluation results were classified to the following 4 grades:

A : No scratches
B : Only a few scratches
C : Many scratches but no problems on the quality of the reproduced images
D : Many scratches causing a noise on the reproduced images (f) Head abrasion (µm)

a sample tape was subjected to a repetitive running test over the whole length for 100 hours with a video deck HR-S5000 produced by Japan Victor Co. at 40.C and RH 80% to measure an abraded thickness of a head.

(g) Head stain a) a 6 MHz signal was recorded at a temperature of 20° C.

and a humidity of 65% for 10 minutes, and the playback operation was repeated 3 times; b) a 8 MHz signal was recorded at a temperature of 20° C. and a humidity of 65% for 2 minutes and a playback output was measured with a spectrum analyzer (value A);

c) the tape was run over the whole length at a temperature of 20° C. and a humidity of 20%;

d) a 8 MHz signal was recorded at a temperature of 20° C. and a humidity of 20% for 2 minutes, and a playback output was measured with a spectrum analyzer (value B);

e) an output deterioration was expressed by the difference of values A and B (A-B) and the head condition was also observed to classify to the following grades:

○: No stains on the glass portion of the head
Δ: Stains on about a half part of the glass portion; and
X : Stains on the whole glass portion.

(h) Rubbing noise a) a playback operation was done without running the tape, and a system noise was measured with a spectrum analyzer;

b) the sample tape was played back 10 times each for one minute, and a rubbing noise was measured with a spectrum analyzer;

c) the noise level at around 8 MHz was determined by averaging the values of tentimes runnings with the standard of the system noise, which was set at 0 dB.

The measurement conditions were as follows: temperature: 20° C., humidity: 10%, video deck: Model HR-S7000.

(i) Adhesiveness level of magnetic layer the following three tests were done and the results were classified to five grades, wherein five points were given to the best mode in which the magnetic layer remained completely, and one point was given to the worst mode in which no magnetic layer remained. The point of each test was summed to calculate the total points (the full marks: 15).

<1> Tape adhesion test an adhesive tape was sticked on a magnetic layer surface and peeled off to observe an amount of a magnetic layer remaining on the surface of a support.

<2> Crumpling test a part of a tape was crumpled to observe an amount of a magnetic layer remaining on the support surface.

<3> Folding test a tape was folded laterally to observe a remaining amount of a magnetic layer on the folded part.

EXAMPLE 2

The magnetic paint having the same composition as in Example 1 was coated on a 15 μm-thick polyethylene terephthalate support having on the magnetic layer side the surface waviness and the protrusions having the height and the number, as shown in Table 3.

Next, after removing the solvents by heating, a surface smoothing treatment was carried out by a super calender under the conditions of a temperature of 60 to 80° C. and a pressure of 100 to 300 kg/cm2 to adjust the surface waviness of the magnetic layer to 0.012 μm. Then, the recording medium was cut to a prescribed size to prepare the video tape Sample No. 18.

Further, the video tape Samples Nos. 19 to 32 were prepared in the same manner in Sample 18, except that the characteristics of the supports and the magnetic layers were changed as shown in Table 3.

The characteristics of the above video tape samples were evaluated in the same manner as in Example 1. The results are shown in Table 4.

TABLE 1

| Sample No. | Surface waviness on magnetic layer (μm) | Surface waviness of support on magnetic layer side (μm) | Number of protrusions not lower than 0.01 μm | Average height of protrusions not lower than 0.01 μm (μm) | Ratio of max. height to average height of protrusions | Number of protrusions not lower than 0.30 μm |
|---|---|---|---|---|---|---|
| 1 (Invention) | 0.010 | 0.011 | 475 | 0.090 | 2.5 | 0 |
| 2 (Invention) | 0.011 | 0.011 | 625 | 0.045 | 4.5 | 0 |
| 3 (Invention) | 0.018 | 0.015 | 625 | 0.045 | 4.2 | 0 |
| 4 (Invention) | 0.011 | 0.011 | 250 | 0.090 | 2.2 | 0 |
| 5 (Invention) | 0.012 | 0.010 | 250 | 0.155 | 1.6 | 0 |
| 6 (Invention) | 0.011 | 0.012 | 375 | 0.092 | 2.4 | 0 |
| 7 (Comparison) | 0.023 | 0.016 | 470 | 0.090 | 2.5 | 0 |
| 8 (Comparison) | 0.024 | 0.018 | 625 | 0.045 | 4.0 | 0 |
| 9 (Comparison) | 0.023 | 0.014 | 500 | 0.091 | 4.5 | 20 |
| 10 (Comparison) | 0.009 | 0.010 | 75 | 0.090 | 2.3 | 0 |
| 11 (Comparison) | 0.010 | 0.010 | 50 | 0.075 | 2.9 | 0 |
| 12 (Comparison) | 0.011 | 0.010 | 200 | 0.221 | 1.3 | 0 |
| 13 (Comparison) | 0.013 | 0.012 | 375 | 0.085 | 4.8 | 560 |
| 14 (Comparison) | 0.011 | 0.011 | 100 | 0.030 | 14.3 | 31 |
| 15 (Comparison) | 0.022 | 0.012 | 400 | 0.090 | 5.6 | 520 |
| 16 (Comparison) | 0.014 | 0.011 | 475 | 0.090 | 5.6 | 1520 |
| 17*[1] (Comparison) | 0.025 | 0.011 | 475 | 0.090 | 2.5 | 0 |

*[1]The sample prepared by roughening the magnetic layer surface after the coating and calendering steps.

TABLE 2

| Sample No. | Chroma S/N, (dB) | Running property | Scratch | Head abrasion, (mm) | Head stain | Rubbing noise, (dB) | Adhesiveness level of magnetic layer |
|---|---|---|---|---|---|---|---|
| 1 (Invention) | +1.0 | ○ | A | 8 | Δ | +2.5 | 11 |
| 2 (Invention) | +0.8 | ○ | A | 10 | Δ | +2.2 | 12 |
| 3 (Invention) | +0.6 | ○ | A | 12 | Δ | +1.9 | 9 |
| 4 (Invention) | +0.8 | ○ | B | 12 | Δ | +3.0 | 10 |
| 5 (Invention) | +0.6 | ○ | B | 14 | X | +3.2 | 8 |
| 6 (Invention) | +1.2 | ○ | A | 10 | Δ | +2.0 | 12 |
| 7 (Comparison) | −1.3 | ○ | A | 13 | Δ | +3.0 | 11 |
| 8 (Comparison) | −2.5 | ○ | A | 9 | Δ | +2.7 | 10 |
| 9 (Comparison) | −1.7 | ○ | C | 10 | Δ | +3.2 | 10 |
| 10 (Comparison) | +1.0 | ○ | C | 10 | X | +3.2 | 10 |
| 11 (Comparison) | +0.7 | X | C | 11 | Δ | +3.0 | 12 |
| 12 (Comparison) | +0.4 | ○ | D | 13 | X | +3.0 | 8 |
| 13 (Comparison) | −1.4 | ○ | D | 11 | Δ | +3.0 | 8 |
| 14 (Comparison) | +0.5 | X | D | 10 | Δ | +2.7 | 8 |
| 15 (Comparison) | +0.0 | ○ | D | 9 | Δ | +2.7 | 11 |
| 16 (Comparison) | +0.3 | ○ | D | 10 | Δ | +3.0 | 12 |
| 17 (Comparison) | +1.3 | Δ | A | 12 | Δ | +2.7 | 8 |

TABLE 3

| Sample No. | Surface waviness on magnetic layer (μm) | Surface waviness of support on magnetic layer side (μm) | Number of protrusions not lower than 0.01 μm | Average height of protrusions not lower than 0.01 μm (μm) | Ratio of max. height to average height of protrusions | Number of protrusions not lower than 0.30 μm |
|---|---|---|---|---|---|---|
| 18 (Invention) | 0.012 | 0.010 | 500 | 0.030 | 4.2 | 0 |
| 19 (Invention) | 0.013 | 0.011 | 375 | 0.060 | 3.3 | 105 |
| 20 (Invention) | 0.012 | 0.011 | 525 | 0.020 | 4.9 | 0 |
| 21 (Invention) | 0.012 | 0.010 | 450 | 0.120 | 2.2 | 0 |
| 22 (Invention) | 0.010 | 0.010 | 425 | 0.135 | 2.0 | 0 |
| 23 (Comparative) | 0.023 | 0.021 | 500 | 0.062 | 4.1 | 23 |
| 24 (Comparative) | 0.024 | 0.021 | 500 | 0.060 | 4.1 | 25 |
| 25 (Comparative) | 0.015 | 0.011 | 500 | 0.060 | 5.4 | 620 |
| 26 (Comparative) | 0.012 | 0.010 | 500 | 0.030 | 11.1 | 500 |
| 27 (Comparative) | 0.012 | 0.010 | 375 | 0.130 | 4.9 | 1050 |
| 28 (Comparative) | 0.012 | 0.013 | 250 | 0.220 | 3.8 | 1160 |
| 29 (Comparative) | 0.009 | 0.010 | 250 | 0.006 | 24.2 | 0 |
| 30 (Comparative) | 0.010 | 0.009 | 50 | 0.005 | 8.2 | 0 |
| 31 (Comparative) | 0.010 | 0.009 | 50 | 0.005 | 40.5 | 0 |
| 32* (Comparative) | 0.010 | 0.009 | 50 | 0.005 | 8.2 | 0 |

*The alumina content of the magnetic layer of Sample No. 30 was increased by 50%.

TABLE 4

| Sample No. | Chroma S/N, (dB) | Running property | Scratch | Head abrasion, (mm) | Head stain | Rubbing noise, (dB) | Adhesiveness level of magnetic layer |
|---|---|---|---|---|---|---|---|
| 18 (Invention) | +0.7 | X | C | 3 | ○ | +1.8 | 15 |
| 19 (Invention) | +0.5 | Δ | C | 5 | ○ | +1.1 | 15 |
| 20 (Invention) | +0.9 | X | D | 2 | ○ | +1.5 | 14 |
| 21 (Invention) | +0.7 | X | D | 3 | ○ | +1.2 | 15 |
| 22 (Invention) | +0.9 | X | C | 4 | ○ | +2.1 | 15 |
| 23 (Comparative) | −1.3 | X | D | 6 | ○ | +1.6 | 14 |
| 24 (Comparative) | −1.9 | Δ | C | 4 | ○ | +1.8 | 15 |
| 25 (Comparative) | +0.4 | X | C | 12 | ○ | +2.4 | 15 |
| 26 (Comparative) | +0.2 | X | C | 11 | Δ | +2.3 | 14 |
| 27 (Comparative) | +0.1 | X | C | 13 | ○ | +2.6 | 15 |
| 28 (Comparative) | +0.2 | X | D | 10 | Δ | +2.1 | 13 |
| 29 (Comparative) | +0.5 | X | D | 10 | Δ | +2.6 | 13 |
| 30 (Comparative) | +1.1 | X | C | 5 | X | +5.6 | 7 |
| 31 (Comparative) | +0.9 | X | D | 10 | X | +4.0 | 8 |
| 32 (Comparative) | +0.5 | X | D | 16 | ○ | +1.4 | 7 |

EXAMPLE 3

Samples No. 33 to No. 39 were prepared and evaluated in the same manners as in Example 2, provided that the both surfaces of the supports and the surfaces of the magnetic layers were changed as shown in Table 5. The results of the evaluation are shown in Table 6.

TABLE 5

| Sample No. | Surface waviness on magnetic layer, (μm) | Surface waviness of support on magnetic layer side (μm) | Number of protrusions not lower than 0.01 μm | | Average protrusion height, (μm) | | Ratio of max. height to average height of protrusions | | Number of protrusions not lower than 0.30 μm | |
|---|---|---|---|---|---|---|---|---|---|---|
| | | | A*1 | B*2 | A | B | A | B | A | B |
| 33 (Invention) | 0.007 | 0.012 | 530 | 530 | 0.045 | 0.043 | 4.2 | 4.5 | 0 | 0 |
| 34 (Invention) | 0.010 | 0.011 | 511 | 535 | 0.045 | 0.048 | 3.3 | 3.1 | 0 | 0 |
| 35 (Invention) | 0.009 | 0.013 | 525 | 553 | 0.090 | 0.097 | 4.1 | 4.3 | 20 | 25 |
| 36 (Comparison) | 0.025 | 0.024 | 520 | 525 | 0.045 | 0.045 | 4.9 | 5.1 | 50 | 60 |
| 37 (Comparison) | 0.011 | 0.012 | 26 | 21 | 0.045 | 0.042 | 4.7 | 4.4 | 100 | 120 |
| 38 (Comparison) | 0.030 | 0.015 | 447 | 421 | 0.075 | 0.070 | 13.0 | 13.5 | 660 | 630 |
| 39 (Comparison) | 0.027 | 0.013 | 522 | 530 | 0.090 | 0.088 | 5.2 | 5.7 | 980 | 960 |

Note:
A . . . Support surface on the magnetic layer side
B . . . Support surface opposite to the magnetic layer

TABLE 6

| Sample No. | Chroma S/N, (dB) | Running property | Scratch | Head abrasion, (mm) | Head stain | Rubbing noise, (dB) | Adhesiveness level of magnetic layer |
|---|---|---|---|---|---|---|---|
| 33 (Invention) | +1.0 | ○ | A | 3 | ○ | +2.0 | 15 |
| 34 (Invention) | +1.2 | ○ | A | 4 | ○ | +2.3 | 14 |
| 35 (Invention) | +0.8 | ○ | A | 6 | ○ | +1.4 | 15 |
| 36 (Comparison) | −0.5 | ○ | A | 5 | X | +2.4 | 14 |
| 37 (Comparison) | −0.2 | X | C | 8 | X | +5.4 | 6 |
| 38 (Comparison) | −0.3 | Δ | D | 10 | ○ | +2.5 | 15 |

TABLE 6-continued

| Sample No. | Chroma S/N, (dB) | Running property | Scratch | Head abrasion, (mm) | Head stain | Rubbing noise, (dB) | Adhesiveness level of magnetic layer |
|---|---|---|---|---|---|---|---|
| 39 (Comparison) | −0.5 | ○ | D | 18 | Δ | +3.0 | 12 |

Example 4

On the support having the characteristics shown in Table 7 consisting of a 14 μm thick polyethyleneterephthalate substrate and provided on the both sides thereof the 0.2 μm thick polyethylene terephthalate films, a magnetic paint prepared in the same manner as in Example 1 was coated in a dry thickness of 4.0 μm.

Next, after removing the solvents by heating, the recording medium was subjected to a surface smoothing treatment with a supercalender under the conditions of a temperature of 60 to 80° C. and a pressure of 100 to 300 kg/cm$^2$ to adjust the surface waviness on the magnetic layer to 0.010 μm. Then, the recording medium was cut to a prescribed size to prepare the video tape Sample No. 40.

Further, the video tape Samples No. 41 to 56 were prepared in the same manner as in Sample No. 40, except that the characteristics of the magnetic layer surfaces, the substrate surfaces and the surfaces I and II were changed as shown in Table 7.

The above samples were evaluated in the same manner as in Example 1 and the results are shown in Tables 8.

TABLE 7

| Sample No. | Surface waviness on magnetic layer, (μm) | Surface waviness of substrate on magnetic layer side (μm) | Number of protrusions on surfaces I and II, not lower than 0.01 μm | Average protrusion height on surfaces I and II (μm) | Ratio of max. height to average height of protrusions on surface I | Number of protrusions on surfaces I and II, not lower than 0.30 μm |
|---|---|---|---|---|---|---|
| 40 (Invention) | 0.010 | 0.010 | 600 | 0.09 | 2.1 | 0 |
| 41 (Invention) | 0.009 | 0.010 | 750 | 0.04 | 4.8 | 0 |
| 42 (Invention) | 0.009 | 0.010 | 580 | 0.04 | 4.8 | 0 |
| 43 (Invention) | 0.015 | 0.014 | 550 | 0.08 | 3.7 | 9 |
| 44 (Invention) | 0.016 | 0.016 | 600 | 0.12 | 3.1 | 67 |
| 45 (Invention) | 0.015 | 0.012 | 420 | 0.15 | 2.2 | 24 |
| 46 (Invention) | 0.019 | 0.012 | 330 | 0.19 | 2.4 | 42 |
| 47 (Invention) | 0.013 | 0.010 | 630 | 0.04 | 7.7 | 37 |
| 48 (Invention) | 0.021 | 0.010 | 330 | 0.19 | 2.4 | 42 |
| 49 (Invention) | 0.014 | 0.010 | 250 | 0.09 | 2.5 | 37 |
| 50 (Comparison) | 0.023 | 0.021 | 600 | 0.09 | 3.3 | 7 |
| 51 (Comparison) | 0.025 | 0.024 | 620 | 0.09 | 4.4 | 67 |
| 52 (Comparison) | 0.023 | 0.011 | 330 | 0.27 | 2.1 | 4000 |
| 53 (Comparison) | 0.030 | 0.012 | 330 | 0.29 | 2.0 | 10000 |
| 54 (Comparison) | 0.023 | 0.012 | 600 | 0.04 | 11.1 | 35 |
| 55 (Comparison) | 0.009 | 0.005 | 120 | 0.09 | 2.1 | 0 |
| 56 (Comparison) | 0.024 | 0.005 | 600 | 0.09 | 4.3 | 620 |

TABLE 8

| Sample No. | Chroma S/N, (dB) | Running property | Scratch |
|---|---|---|---|
| 40 (Invention) | +0.8 | ○ | A |
| 41 (Invention) | +1.2 | ○ | A |
| 42 (Invention) | +1.1 | ○ | A |
| 43 (Invention) | +0.7 | ○ | A |
| 44 (Invention) | +0.7 | ○ | A |
| 45 (Invention) | +0.4 | ○ | A |
| 46 (Invention) | +0.7 | ○ | A |
| 47 (Invention) | +0.4 | ○ | A |
| 48 (Invention) | +0.3 | ○ | B |
| 49 (Invention) | +0.6 | ○ | A |
| 50 (Comparison) | −1.4 | ○ | B |
| 51 (Comparison) | −2.4 | ○ | B |
| 52 (Comparison) | −0.9 | ○ | B |
| 53 (Comparison) | −2.2 | ○ | C |
| 54 (Comparison) | −1.6 | ○ | D |
| 55 (Comparison) | +1.1 | Δ | D |
| 56 (Comparison) | −1.6 | ○ | A |

What is claimed is:

1. A magnetic recording medium comprising a support and a magnetic layer thereon containing a magnetic powder and a binder resin, wherein
   1) a surface waviness of the magnetic layer is 0.022 μm or less;
   2) a surface waviness of the support on a magnetic layer side is 0.020 μm or less; and
   3) at least one of two surfaces of the support has protrusions thereon satisfying the following relationships:
      a. an average height is from 0.01 μm to 0.25 μm,
      b. a number of the protrusions not lower than 0.01 μm is not less than 200 per linear millimeter measured along said support,
      c. a number of the protrusions not lower than 0.30 μm is not more than 500 per 400 linear millimeters measured along said support, and
      d. a ratio of a maximum height to said average height is not more than 10.

2. The recording medium of claim 1 wherein the surface waviness of the magnetic layer is 0.020 μm.

3. The recording medium of claim 1 wherein the surface waviness of the support on the magnetic layer side is 0.018 μm or less.

4. The recording medium of claim 1 wherein the average height of the protrusions on at least one of the support surfaces is from 0.01 μm to 0.20 μm.

5. The recording medium of claim 1 wherein the number of the protrusions not lower than 0.01 μm is from 200 to 2000 per 1 mm.

6. The recording medium of claim 1 wherein the number of the protrusions not lower than 0.30 μm is not more than 100.

7. The recording medium of claim 1 wherein the ratio of the maximum height to the average height of the protrusions is not more than 5.

8. The recording medium of claim 1 wherein filler particles having an average particle size of not more than 2 μm are incorporated into the support to form the protrusions on at least one of the support surfaces.

9. The recording medium of claim 1 wherein said binder comprises a resin having a negative functional group.

10. The recording medium of claim 9 wherein said binder comprises at least one vinyl chloride resin, polyester resin, and polyurethane resin, each having a negative functional group.

11. A magnetic recording medium comprising a support consisting essentially of a substrate and films provided on both sides thereof, a magnetic layer containing a magnetic powder on said support, and a binder, wherein 1) a surface waviness of the magnetic layer is 0.22 μm or less;

2) a surface waviness of the substrate is 0.020 μm or less; and 3) a film surface opposite to the substrate has protrusions thereon satisfying the following relationships:
   a. an average height is from 0.01 μm to 0.25 μm,
   b. a number of the protrusions not lower than 0.01 μm is not less than 200 per linear millimeter measured along said support,
   c. a number of the protrusions not lower than 0.30 μm is not more than 500 per 400 linear millimeters measures along said support; and 4) a ratio of a maximum height to said average height of said protrusions is not more than 10, said film being on the side opposite to the magnetic layer side of said substrate.

12. The recording medium of claim 11 wherein the surface waviness of the magnetic layer is 0.020 μm.

13. The recording medium of claim 11 wherein the surface waviness of the support on the magnetic layer side is 0.018 μm or less.

14. The recording medium of claim 11 wherein the average height of the protrusions on at least one of the support surfaces is from 0.01 μm to 0.20 μm.

15. The recording medium of claim 11 wherein the number of the protrusions not lower than 0.01 μm is from 200 to 2000 per 1 mm.

16. The recording medium of claim 11 wherein the number of the protrusions not lower than 0.30 μm is not ore than 100.

17. The recording medium of claim 11 wherein the ratio of the maximum height to the average height of the protrusions is not more than 5.

18. The recording medium of claim 11 wherein filler particles having an average particle size of not more than 2 μm are incorporated into the films to form the protrusions thereon.

19. The recording medium of claim 11 wherein the binder comprises a resin having a negative functional group.

20. The recording medium of claim 19 wherein the binder comprises at least of a vinyl chloride resin, a polyester resin and a polyurethane resin each having a negative functional group.

* * * * *